No. 814,373. PATENTED MAR. 6, 1906.
J. F. HAMMOND.
DYNAMOMETER.
APPLICATION FILED MAR. 3, 1905.

Witnesses:

Inventor:
John F. Hammond,
By his attorney,
F. H. Richards.

UNITED STATES PATENT OFFICE.

JOHN F. HAMMOND, OF NEW YORK, N. Y.

DYNAMOMETER.

No. 814,373.

Specification of Letters Patent.

Patented March 6, 1906.

Application filed March 3, 1905. Serial No. 248,240.

*To all whom it may concern:*

Be it known that I, JOHN F. HAMMOND, a citizen of the United States, residing in the borough of Manhattan, city of New York, in the county of New York and State of New York, have invented certain new and useful Improvements in Dynamometers, of which the following is a specification.

This invention has reference to apparatus for measuring the amount of work done by motors or similar mechanism in moving a load.

It is a design of the invention to provide for a determination of the capacity of such mechanism or motors by calculating the speed of the motor in connection with a resistance of preferably predetermined value.

It is also a design of the invention to vary the amount of resistance to determine the power developed at varying speeds.

The principle of the invention may be embodied into any suitable form of mechanism best calculated to give efficient results, and one of such forms is illustrated on the accompanying sheet of drawings, whereon—

Figure 1:
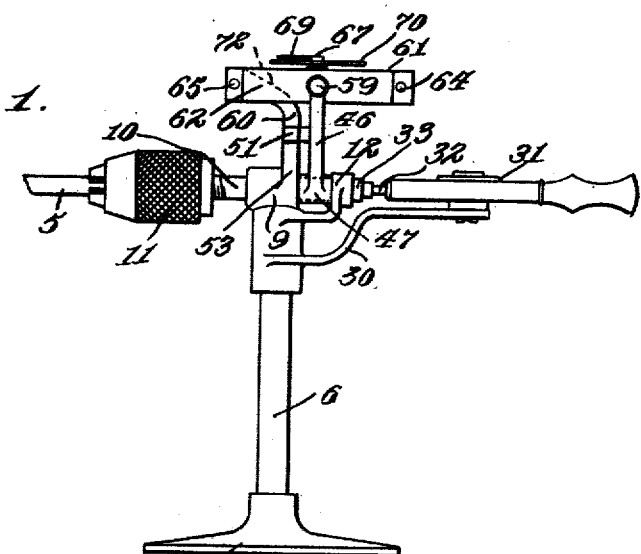
Figure 2:
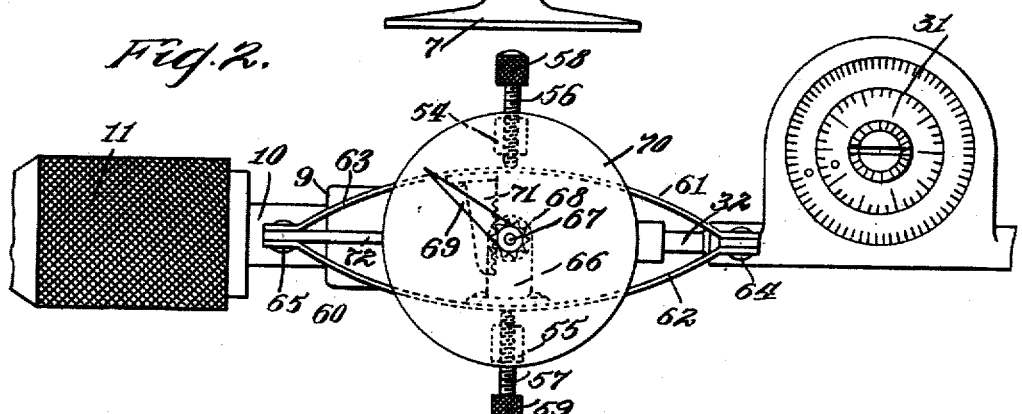
Figure 3:
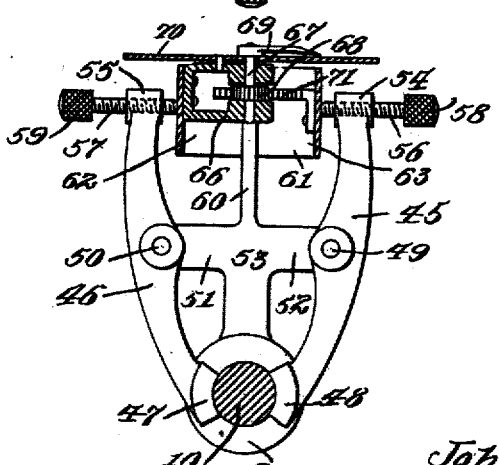

Figure 1 illustrates an elevation of a speed-determining device or dynamometer. Fig. 2 is a plan view of the same, and Fig. 3 is a sectional view of a portion of the device.

In the several illustrations similar characters of reference apply.

While this device may be supported in connection with a driving or motor shaft 5 in any suitable manner, that structure which is herein illustrated may be supported on a standard 6, extending from a base 7, and which standard at its upper portion may be provided with a bearing 9, in which is supported a shaft 10, upon which may be removably mounted suitable means for creating a connection between said shaft 10 and a motor-shaft 5, such means in the present instance being shown as a chuck 11. Upon a bracket 30, which may be integral with or mounted upon the standard 6, is carried a counter 31, whose shaft 32 is associated with the end 33 of the shaft 10, whereby the velocity of the shaft 10, as well as the shaft 5, may be mechanically determined.

The arms 45 and 46, each provided with shoes 47 and 48, may be fulcrumed upon bearings 49 and 50, carried by supporting-arms 51 and 52 of a support 53, carried by the bearing 9. The upper extremities 54 and 55, respectively, of the arms 45 and 46 may be provided with right and left screw-threaded bores, into which may be movably mounted right and left screw-threaded members 56 and 57, which in the present instance may be provided with milled heads 58 and 59, respectively. Supported by an upward-extended beam 60 of the standard 53 is a resilient member 61, which may constitute an elliptical spring having two portions 62 and 63, which may be united by rivets 64 and 65, and between which spring portions 62 and 63 may be located a beam 72, by which to mount the elliptical spring 61 upon the standard 60. On the interior of one of the spring elements—for instance, that designated by 62—may be mounted a bracket 66, which supports a shaft 67, provided with a pinion 68, and upon the upper end of which is mounted an indicator 69, adapted to travel upon a dial 70, suitably mounted upon said bracket 66. On the opposite spring member 63 there is mounted a rack 71, which meshes with the pinion 68 on the shaft 67. Hence it will be seen that as the thumb-pieces 58 and 59 are manipulated against the spring members 62 and 63 the shoes 47 and 48 will be correspondingly borne against the shaft 10 until the required amount of resistance, which in this case will be frictional, has been created to impede the rotation of the shaft, and according to the extent it will be necessary to compress the springs 62 and 63 to effect such frictional resistance, the rack 71 and bearing 66 moving relatively toward each other, the pinion 68 will turn the shaft 67, and thereby the indicator 69, thus indicating on the dial 70 the power exerted to impede revolutions of the shaft to any definite speed per minute.

Within the purview of this invention I may resort to various constructions or assembled parts so long as I maintain the integrity of the principle of this invention.

Having thus described my invention, I claim—

1. The combination of a support, a shaft having bearings on the support, a pair of arms pivoted on the support and frictionally engaging said shaft on opposite sides respectively, a spring member having opposite portions arranged in proximity to said arms respectively, an adjustable member carried by each arm and contacting with opposite portions of the spring, an indicating device connected to one portion of the spring in close proximity to its portion engaging said contact device, and an arm on the opposite portion of the spring member adjacent its engagement with the contact device, and means on the indicating device whereby the movement of the spring effected by each of said adjustable contacts will operate the indicating means.

2. The combination of a support, a shaft having a bearing on said support, a pair of arms independently pivoted on said support and having their extremities engaging opposite portions of said shaft respectively, an elliptical spring supported from one end on said support and arranged with its intermediate portion between said arms, an adjusting-screw carried by each arm and engaging opposite middle portions of the spring respectively whereby the spring will swing the arms to tightly engage said shaft, a supporting-arm screwed to one portion of the spring adjacent its portion engaged by said screw, a spindle rotatable on said supporting-arm, a pointer carried on the spindle, a dial arranged adjacent the path of the pointer, a gear mounted on said spindle, and a rack-arm secured to the portion of the spring engaged by the other said screw and having its rack portion meshing with said gear, whereby the adjustment of said spring by each said screw, will be relatively indicated by said pointer on the dial.

Signed at Nos. 9 to 15 Murray street, New York, N. Y., this 1st day of March, 1905.

JOHN F. HAMMOND.

Witnesses:
FRED. W. BARNACLO,
JOHN O. SEIFERT.